United States Patent [19]

Hälker

[11] Patent Number: 4,948,658

[45] Date of Patent: Aug. 14, 1990

[54] STRIP OF MATERIAL AND ITS MANUFACTURING METHOD

[75] Inventor: Helmut Hälker, Niederzier, Fed. Rep. of Germany

[73] Assignee: Thomas Josef Heimbach GmbH & Co., Duren, Fed. Rep. of Germany

[21] Appl. No.: 193,595

[22] Filed: May 13, 1988

[30] Foreign Application Priority Data

May 14, 1987 [EP] European Pat. Off. ........ 87106979.5

[51] Int. Cl.$^5$ ........................... B32B 5/02; B32B 5/06

[52] U.S. Cl. ...................................... 428/234; 139/35; 139/383 A; 139/432; 428/238; 428/253; 428/257; 428/258; 428/259; 428/294

[58] Field of Search ............... 428/226, 234, 238, 253, 428/257, 258, 259, 294; 66/84 R, 195, 203; 139/35, 383 A, 432; 28/107

[56] References Cited

U.S. PATENT DOCUMENTS

| | | | |
|---|---|---|---|
| 1,811,081 | 6/1931 | Hartwell . | |
| 2,098,993 | 11/1937 | Barrell | 139/426 |
| 2,217,826 | 10/1940 | Van Laer | 96/26 |
| 4,552,620 | 11/1985 | Adams | 162/358 |
| 4,559,257 | 12/1985 | Kiochi | 428/156 |

FOREIGN PATENT DOCUMENTS

| | | |
|---|---|---|
| 0106132 | 8/1984 | European Pat. Off. . |
| 0138797 | of 1985 | European Pat. Off. . |
| 3114405 | 10/1982 | Fed. Rep. of Germany . |
| 3304345 | 10/1984 | Fed. Rep. of Germany . |
| 186813 | 10/1922 | United Kingdom . |

*Primary Examiner*—Marion C. McCamish
*Attorney, Agent, or Firm*—Shlesinger & Myers

[57] ABSTRACT

A strip of material, especially for papermaking machine cloth covers for the pressing zone, as a filter or as pressing pad for the particle-board presses, comprises individual, longitudinal threads and orthogonally thereto individual transverse threads. In order to endow the strip with a structure such that on one hand it can be manufactured rapidly and economically, and on the other hand to allow wide latitude in shaping its properties, the threads (1) extending in one direction always consist each of a core filament (2) and of at least one loop thread (3) enclosing this filament.

20 Claims, 2 Drawing Sheets

STRIP OF MATERIAL AND ITS MANUFACTURING METHOD

The invention concerns a strip of material, in particular for equipping papermaking machines in their pressing zones, in the form of a filter or a pressing pad for the particle-board presses, with loop threads extending in one direction and each enclosing a core filament, and with binding threads orthogonal thereto. The invention further concerns a method for manufacturing a strip of material wherein mesh threads are produced together with the core filaments they enclose and then are connected in parallel positions, following alignment, by binding threads.

The European patent document No. A 0 106 132 describes a cloth-equipped papermaking machine using loop threads extending in one direction. These loop threads may contain core filaments of diverse materials. According to the embodiment illustrated in FIG. 3, the loop threads are woven together with transverse filling threads, that is, the filling threads are made to pass around the loop threads. Again the description in principle starts from a woven papermaking machine cloth covering. The loop threads are machine knitted individually and then are woven with the filling threads, possibly with further warps, in a loom.

A corresponding papermaking machine cloth cover is described in the European patent application No. 0 059 973. In this wet felt too there is a fabric in which several longitudinal warps are in the form of knitted threads. These threads are elastically compressible and thereby are meant to improve dehydration and return to the initial conditions.

The papermaking machine cloths described in the above prior publications all are produced conventionally, that is by weaving. This kind of manufacture is time consuming and hence costly, especially when such cloths must be very wide.

Moreover the attempt has been made to manufacture such papermaking machine cloths from warp knits, for instance as shown in the German patent document No. A 24 36 293. In such a warp knit the individual longitudinal threads mesh transversely, that is in principle no cross threads are provided to bind them in that direction. However, it is suggested to provide additional filaments in the direction of the warps or fillings to enhance the structural integrity of the warp knit. Even though the use of such warp knits as a support structure holds out the promise of savings, so far such papermaking machine cloths have not been used.

Lastly, papermaking machine felts are known, for instance for filtration, which consist of transversely parallel bulky filaments and of longitudinal, mutually parallel and spaced knit stitches (German patent document No. A 2 13 421). The transverse filaments pass through the loops of the knit stitches and the material so formed is then needled for felting. Essentially the transverse filaments form the effective filtering fiber material whereas the knit stitches impart some strength in the lengthwise direction. Moreover filling threads are provided that connect the knit stitches to each other in the transverse direction. However a papermaking machine felt of this design fails to meet the high stresses to which the machine's cloths or pressing pads are exposed, and therefore they are unsuited for such purposes.

The object of the invention is to impart such a structure to a strip of material of the initially cited kind that it allows quick and economical manufacture, and to create a method for such manufacture.

The first object is solved by the invention in that the binding threads are in the form of magazine fillings passing straight through the loop threads.

In spite of the similarity to weaving, such strip structure nevertheless allows rapid and economical manufacture on a knitting machine using the method of the invention wherein all the loop threads are produced simultaneously and at the desired mutual spacing by continuous loop formation with simultaneous feeding of the core filament, and wherein immediately thereafter a magazine filling is driven through the loop threads. Accordingly the strip manufacture requires only a correspondingly wide knitting machine with filling magazine. The set-up time of this knitting machine is very short compared to weaving looms and productivity is substantially higher. The core filaments may be matched optimally to any requirement, with the most diverse materials being combined. The loop thread so holds together the core filament that the individual strands of the filament need not be twisted. It is enough that it be present as a bundle of strands. Accordingly yarn materials can furthermore be employed or combined that do not allow being twisted together. Additional savings are achieved by eliminating such twisting.

Another advantage of the strip of material of the invention is that the cloth cover evinces a pronounced longitudinal structure in the direction of the threads formed by the loop threads and core filaments. Where this strip is used as a papermaking machine cloth and where this structure is in the longitudinal direction of that cloth, a draining effect is achieved in that direction. In the light of the latest knowledge regarding dehydration in the pressing gap between two compression rollers, such drainage is highly desirable and leads to high paperweb dehydration.

Appropriately the loop threads consist of thin monofilaments because being required to absorb only low tensional forces. Appropriately the tensional forces are absorbed by the tension threads forming, or present as part of, the core filaments. In addition, filler threads of the most diverse materials also may be inserted to provide the core filaments with the desired volume. Illustratively textile fiber threads, multifilaments, foam rolls, tapes or even mineral fibers, straw, paper and electrically conductive substances such as metal fibers or the like may be inserted. Where a tension thread is present, the tensile strength of the filler threads no longer matters, whereby furthermore yarn or thread material also may be used which evinces low tensile strength.

Preferably the magazine fillings shall all exit on one side of the core filaments, and appropriately on their back side. In that case the paper contact side shall be formed only by the threads consisting of the combination of loop threads and filaments. As a result, a pronounced longitudinal structure with good draining will be achieved also on that side.

Monofilaments, but also and in particular thin multifilaments are suitable for the threads extending in the other direction, the multifilaments slipping less and thereby assuring better cross-stability of the longitudinal threads.

A further development of the invention provides that the strip of material be in the form of needled felt. This can be implemented in that the core filaments consist of a bulky fiber material needled for purposes of felting. However a nonwoven material may be deposited on at least one side of the cloth covering and be connected by needling to the thread structure. Such a needled felt is especially suitable as a filter, further as a papermaking machine cloth, in particular as a wet felt for the pressing zone.

There is the possibility besides to incorporate the strip of material into a liquid-impermeable plastic band which then shall be used in wet presses with an extended pressing gap (see for instance the European patent document No. A3 0 138 797, the German patent document No. A1 32 31 039). Alternatively or in combination, the strip of material may be incorporated only in part into a liquid-impermeable plastic band and projects from one side of this band while forming open channels to drain the liquids (see European patent document No. A2 0 098 502, German patent document No. A1 32 35 468). Accordingly, the strip of material is widely applicable.

The drawing more closely illustrates the invention in relation to embodiments.

Figure 1:
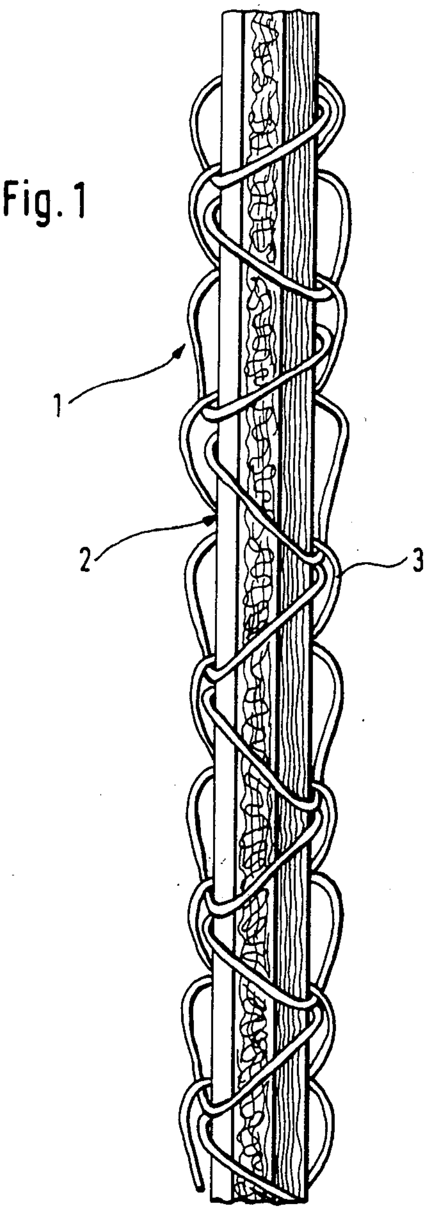
FIG. 1 is a top view of the longitudinal thread of a papermaking machine cloth covering.
Figure 2:
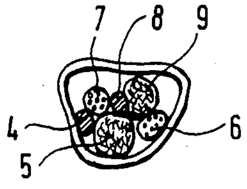
FIG. 2 is a cross-section of the longitudinal thread of FIG. 1.

Basically the longitudinal thread 1 shown in FIGS. 1 and 2 consists of a core filament 2 and of a warp-knitted loop thread 3 enclosing the core filament 2. As shown in particular in FIG. 2, the core filament 2 forms a bundle of a total of six individual threads 4, 5, 6, 7, 8, 9. Two of these individual threads 4, 8 are monofilaments made of a high tensile strength material such as polyamide and essentially they absorb the tensile stresses acting on the longitudinal thread 1. The other individual threads 5, 6, 7, 9 may consist of the most diverse materials because being traction-relieved by the monofilar individual threads 4, 8. The bundle of threads is not twisted together because being enclosed by the loop thread 3 and thereby being kept together.

Figure 3:
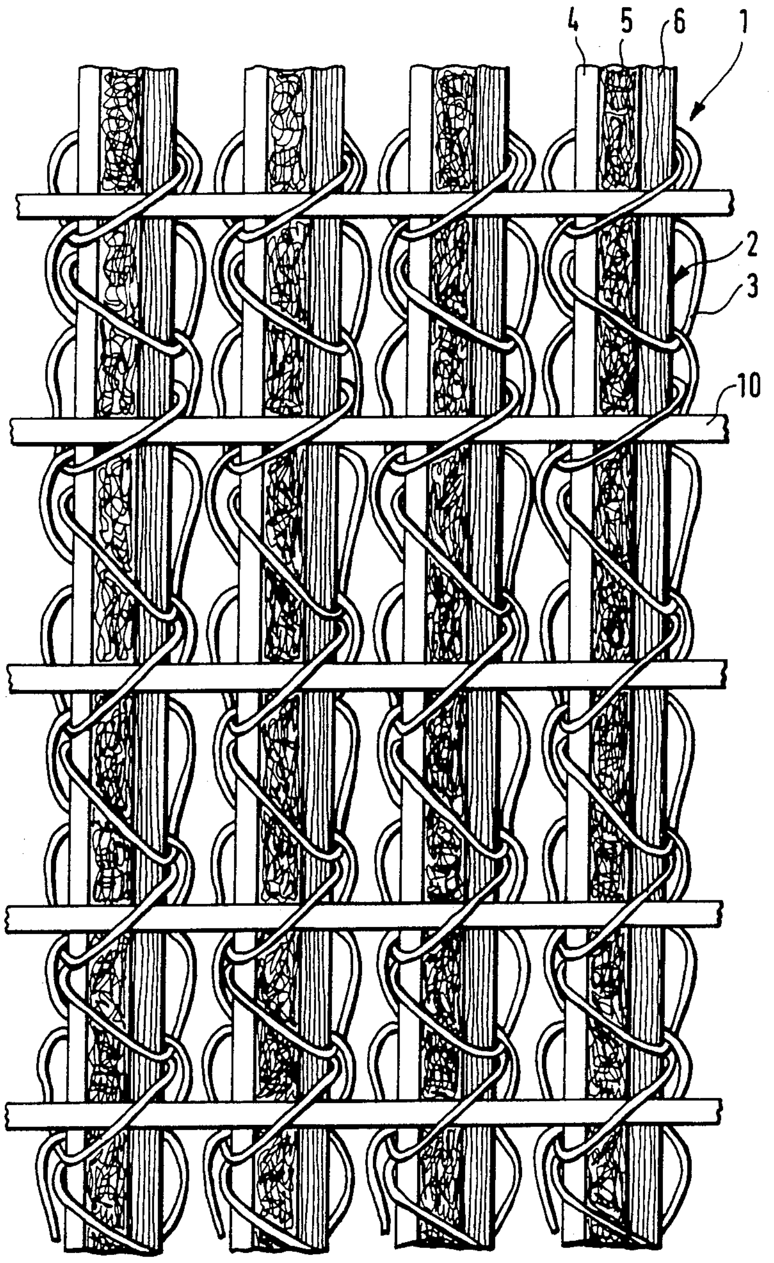
FIG. 3 is a top view of part of a papermaking machine cloth using the longitudinal thread of FIGS. 1 and 2.

FIG. 3 shows a cutaway of a papermaking machine cloth cover produced using the longitudinal threads 1 shown in FIGS. 1 and 2. The longitudinal threads 1 are parallel to the direction of advance of the papermaking machine cloth. The thread density is comparatively low, for instance being 3 threads/cm. Thereby draining channels are provided between the longitudinal threads 1 to enhance dehydration. Machine fillings illustratively denoted by 10 extend transversely at regular intervals. They each cross the loops of the loop threads 3 and rest against the underside of the core filaments 2. Their mutual spacing can be varied by the number of loops per unit length and by not placing a magazine filling 10 through every loop. Illustratively a loop density may be 6 to 9 loops/cm and the machine filling density may be 3 threads/cm. Obviously other values also are applicable.

The cutaway shown in FIG. 3 only shows one layer of the papermaking machine cloth cover. However it is feasible to superpose several such layers and to connect them by felt needling. If the stitchings of the individual layers are mutually offset, a special stitching will be not be necessary.

I claim:

1. A strip of material for a papermaking machine, comprising:

(a) a plurality of associated loop threads, each loop thread including a plurality of loops and the loops of said loop threads extending in a common direction;

(b) a plurality of core threads, each core thread passing through the loops of an associated loop thread; and, (c) a plurality of binding threads extending orthogonal to and through associated loops of said loop threads, each binding thread comprising a magazine filling.

2. The strip of claim 1, wherein:

(a) each of said core threads includes a core filament; and, (b) at least one loop thread surrounds each filament.

3. The strip of claim 1, wherein:

(a) each loop thread comprises a warp knit material.

4. The strip of claim 1, wherein:

(a) each loop thread is a monofilament.

5. The strip of claim 1, wherein:

(a) each core thread comprises an untwisted bundle of threads.

6. The strip of claim 5, wherein:

(a) at least one thread of each said bundle is a filler thread; and, (b) at least one thread of each said bundle is a tension thread.

7. The strip of claim 5, wherein:

(a) at least one thread of each said bundle is comprised of an electrically conductive material.

8. The strip of claim 1, wherein:

(a) said core threads define a front and a rear; and, (b) said magazine fillings are disposed along said rear.

9. The strip of claim 1, wherein:

(a) said magazine fillings are selected from the group consisting of monofilament and multifilament.

10. The strip of claim 1, further comprising:

(a) means needling said loop, core and binding threads into a felt.

11. The strip of claim 1, wherein:

(a) said core threads define a front and a rear; and, (b) a needled nonwoven material is disposed along one of said front and rear.

12. The strip of claim 1, further comprising:

(a) a liquid impermeable plastic band; and, (b) said loop, core and binding threads are incorporated into said band.

13. The strip of claim 12, wherein:

(a) a portion of said loop, core and binding threads project from said band and define a plurality of drain channels thereon.

14. A strip for the pressing zone of a papermaking machine, comprising:

(a) a plurality of laterally spaced loop threads, each loop thread selected from the group consisting of warp knit material and monofilament and each loop thread includes a plurality of loops and the loops of all loop threads extend in a common direction;

(b) a plurality of core threads, each core thread passing through the loops of an associated loop thread so that said core threads are disposed in a parallel array; and, (c) a plurality of binding threads extending orthogonal to and through adjacently disposed loops of said loop threads, each binding thread selected from the group consisting of monofilament and multifilament.

15. The strip of claim 14, wherein:

(a) each of said core threads comprises an untwisted bundle of threads.

16. The strip of claim 15, wherein:

(a) at least one thread of each said bundle is a filler thread;

(b) at least one thread of each said bundle is a tension thread; and, (c) at least one thread of each said bundle is comprised of an electrically conductive material.

17. The strip of claim 14, further comprising:

(a) means needling said loop, core and binding threads into a felt.

18. The strip of claim 14, wherein:

(a) said strip has a front and a rear; and, (b) a needled nonwoven material is disposed along one of said front and rear.

19. The strip of claim 14, further comprising:

(a) a liquid impermeable band; and, (b) said loop, core and binding threads are incorporated into said band.

20. The method of manufacturing a strip of material, comprising the steps of:

(a) continuously producing a plurality of mutually spaced loop threads, each of which has a continuous loop formation;

(b) simultaneously therewith feeding a core filament through the loop formation of each loop thread; and, (c) simultaneously therewith driving a magazine filling through and orthogonal to the loop threads.

* * * * *